(12) United States Patent
Stenfort

(10) Patent No.: US 8,140,712 B2
(45) Date of Patent: Mar. 20, 2012

(54) SYSTEM, METHOD, AND COMPUTER PROGRAM PRODUCT FOR INSERTING A GAP IN INFORMATION SENT FROM A DRIVE TO A HOST DEVICE

(75) Inventor: Ross John Stenfort, Los Altos, CA (US)

(73) Assignee: SandForce, Inc., Milpitas, CA (US)

( * ) Notice: Subject to any disclaimer, the term of this patent is extended or adjusted under 35 U.S.C. 154(b) by 0 days.

(21) Appl. No.: 12/505,333

(22) Filed: Jul. 17, 2009

(65) Prior Publication Data

US 2011/0016233 A1    Jan. 20, 2011

(51) Int. Cl.
G06F 3/00 (2006.01)
G06F 12/00 (2006.01)
G06F 13/00 (2006.01)
G06F 13/28 (2006.01)

(52) U.S. Cl. ............................. 710/5; 711/154; 711/167

(58) Field of Classification Search .................. 710/5
See application file for complete search history.

(56) References Cited

U.S. PATENT DOCUMENTS

| | | | |
|---|---|---|---|
| 5,485,595 A | 1/1996 | Assar et al. | 395/430 |
| 5,544,356 A | 8/1996 | Robinson et al. | 395/600 |
| 5,568,423 A | 10/1996 | Jou et al. | 365/185.33 |
| 5,568,626 A | 10/1996 | Takizawa | 395/430 |
| 5,621,687 A | 4/1997 | Doller | 365/185.29 |
| 5,819,307 A | 10/1998 | Iwamoto et al. | 711/103 |
| 5,835,935 A | 11/1998 | Estakhri et al. | 711/103 |
| 5,881,229 A | 3/1999 | Singh et al. | 395/200.33 |
| 5,956,473 A | 9/1999 | Ma et al. | 395/182.03 |
| 5,963,970 A | 10/1999 | Davis | 711/103 |
| 6,000,006 A | 12/1999 | Bruce et al. | 711/103 |
| 6,085,248 A * | 7/2000 | Sambamurthy et al. | 709/229 |
| 6,154,808 A | 11/2000 | Nagase et al. | 711/103 |
| 6,230,233 B1 | 5/2001 | Lofgren et al. | 711/103 |
| 6,405,295 B1 | 6/2002 | Bando | 711/165 |
| 6,539,453 B1 | 3/2003 | Guterman | 711/103 |
| 6,600,614 B2 | 7/2003 | Lenny et al. | |
| 6,694,402 B1 | 2/2004 | Muller | 711/103 |
| 6,732,221 B2 | 5/2004 | Ban | 711/103 |
| 6,831,865 B2 | 12/2004 | Chang et al. | 365/185.33 |
| 6,914,853 B2 | 7/2005 | Coulson | 365/236 |

(Continued)

FOREIGN PATENT DOCUMENTS

KR    200800090021    10/2008

(Continued)

OTHER PUBLICATIONS

International Search Report for PCT/US2010/042147, mailed Mar. 24, 2011, 9 pages.

(Continued)

Primary Examiner — Chun-Kuan Lee
Assistant Examiner — Ronald Modo
(74) Attorney, Agent, or Firm — PatentVentures; Bennett Smith; Korbin Van Dyke

(57) ABSTRACT

A system, method, and computer program product are provided for inserting a gap in information sent from a drive to a host device. In operation, one or more commands are received at a drive from a host device. Additionally, information is queued to send to the host device. Furthermore, a gap is inserted in the information to send to the host device such that the host device is capable of sending additional commands to the drive.

21 Claims, 4 Drawing Sheets

U.S. PATENT DOCUMENTS

| | | | | |
|---|---|---|---|---|
| 6,925,523 | B2 | 8/2005 | Engel et al. | 711/103 |
| 6,928,494 | B1 * | 8/2005 | Volk et al. | 710/52 |
| 6,948,026 | B2 | 9/2005 | Keays | 711/103 |
| 6,973,531 | B1 | 12/2005 | Chang et al. | 711/103 |
| 6,985,992 | B1 | 1/2006 | Chang et al. | 711/103 |
| 7,000,063 | B2 | 2/2006 | Friedman et al. | 711/103 |
| 7,003,623 | B2 | 2/2006 | Teng | |
| 7,032,087 | B1 | 4/2006 | Chang et al. | 711/156 |
| 7,035,967 | B2 | 4/2006 | Chang et al. | 711/103 |
| 7,096,313 | B1 | 8/2006 | Chang et al. | 711/103 |
| 7,103,732 | B1 | 9/2006 | Chang et al. | 711/156 |
| 7,120,729 | B2 | 10/2006 | Gonzalez et al. | 711/103 |
| 7,222,214 | B2 | 5/2007 | Belevich et al. | |
| 7,549,013 | B2 | 6/2009 | Estakhri et al. | |
| 7,620,747 | B1 | 11/2009 | Overby et al. | |
| 7,631,128 | B1 * | 12/2009 | Sgrosso et al. | 710/105 |
| 7,747,813 | B2 | 6/2010 | Danilak | |
| 7,809,900 | B2 | 10/2010 | Danilak | |
| 7,827,320 | B1 * | 11/2010 | Stevens | 710/5 |
| 7,849,275 | B2 | 12/2010 | Danilak | |
| 7,903,486 | B2 | 3/2011 | Danilak | |
| 7,904,619 | B2 | 3/2011 | Danilak | |
| 7,904,672 | B2 | 3/2011 | Danilak | |
| 7,904,764 | B2 | 3/2011 | Danilak | |
| 2003/0041214 | A1 | 2/2003 | Hirao et al. | |
| 2005/0166014 | A1 | 7/2005 | Kobayashi et al. | |
| 2006/0209684 | A1 | 9/2006 | Bei | |
| 2006/0218437 | A1 | 9/2006 | Kawa et al. | |
| 2008/0005398 | A1 | 1/2008 | Huffman | |
| 2008/0141054 | A1 | 6/2008 | Danilak | |
| 2008/0233798 | A1 | 9/2008 | Yu et al. | |
| 2008/0282031 | A1 | 11/2008 | Tanoue | |
| 2008/0294801 | A1 | 11/2008 | Matsuda | |
| 2008/0294813 | A1 | 11/2008 | Gorobets | |
| 2009/0094409 | A1 | 4/2009 | Yeh et al. | |
| 2009/0125645 | A1 | 5/2009 | Prevost et al. | |
| 2009/0138671 | A1 | 5/2009 | Danilak | |
| 2009/0300259 | A1 | 12/2009 | Luo et al. | |
| 2010/0017566 | A1 | 1/2010 | Danilak | |
| 2010/0017588 | A1 | 1/2010 | Danilak | |
| 2010/0017650 | A1 | 1/2010 | Chin et al. | |
| 2010/0017807 | A1 | 1/2010 | Danilak | |
| 2010/0037001 | A1 | 2/2010 | Langlois et al. | |
| 2010/0064093 | A1 | 3/2010 | Danilak | |
| 2010/0064096 | A1 | 3/2010 | Weingarten et al. | |
| 2010/0067133 | A1 | 3/2010 | Ooi | |
| 2010/0106905 | A1 | 4/2010 | Kurashige et al. | |
| 2010/0115189 | A1 | 5/2010 | Lin et al. | |
| 2010/0146236 | A1 | 6/2010 | Danilak | |
| 2010/0250829 | A1 | 9/2010 | Stenfort | |
| 2010/0250830 | A1 | 9/2010 | Stenfort | |
| 2010/0251009 | A1 | 9/2010 | Stenfort | |
| 2011/0004722 | A1 | 1/2011 | Jeddeloh | |
| 2011/0016239 | A1 | 1/2011 | Stenfort | |
| 2011/0022765 | A1 | 1/2011 | Stenfort | |
| 2011/0041005 | A1 | 2/2011 | Selinger | |
| 2011/0041039 | A1 | 2/2011 | Harari et al. | |
| 2011/0083047 | A1 | 4/2011 | Stenfort | |
| 2011/0125956 | A1 | 5/2011 | Danilak | |
| 2011/0167199 | A1 | 7/2011 | Danilak | |

FOREIGN PATENT DOCUMENTS

| | | |
|---|---|---|
| WO | WO2011008963 A2 | 1/2011 |
| WO | WO2011008963 A3 | 1/2011 |

OTHER PUBLICATIONS

Intel X25-E SATA Solid State Drive, May 2009, Document Order No. 319984-005US, Intel, Jun. 7, 2011 office action in U.S. Appl. No. 12/573,792, 24 pages.

Ren, Jin and Yang, Qing; "I-CASH: Intelligently Coupled Array of SSD and HDD" in The 17th IEEE International Symposium on High Performance Computer Architecture, 2011 (HPCA'11), San Antonio, TX, USA Feb. 2011, 12 pages, pp. 278-298.

Serial ATA NSSD(NAND based Solid State Drive), Jul. 2008, Samsung, Jun. 7, 2011 office action in U.S. Appl. No. 125/73,792 Revision 1.0, 39 pages.

Huffman, Amber and Clark, Joni;" Serial ATA Native Command Queuing, An Exciting New Performance Feature for Serial ATA", A Joint Whitepaper by: Intel Corporation and Seagate Technology, Jul. 2003, United States, 12 pages.

Olson, Alan Rand Denis J Langlois, Solid State Drives Data Reliability and Lifetime, Apr. 7, 2008, Imation, 27 pages.

"Serial ATA II Native Command Queuing Overview", Application Note, Apr. 2003, Order No. 252664-002, Intel Corporation, United States, 21 pages.

Oct. 7, 2011 List of Art Rejections in Cases Related, 1 page.

* cited by examiner

SYSTEM, METHOD, AND COMPUTER PROGRAM PRODUCT FOR INSERTING A GAP IN INFORMATION SENT FROM A DRIVE TO A HOST DEVICE

FIELD OF THE INVENTION

The present invention relates to memory systems, and more particularly to receiving commands at a drive from a host device once the drive started sending data.

BACKGROUND

In many storage systems, target devices have priority when transmitting frames over a host when there is a collision. In these cases, when queuing commands (e.g. using First Party Direct Memory Access, etc.), once the target has sent a direct memory access (DMA) setup frame information structure (FIS) to enter the data phase, the host can not typically send any commands to the target device.

If the drive is able to fetch data quickly, then the host could send a number of commands equal to the maximum queue depth to the drive. The drive may then return a DMA setup, data, a DMA setup, data, etc. without any breaks between the frames. This does not allow the host to send any more commands.

In these cases, the queue depth of the drive may oscillate from a maximum queue depth to zero, back to the maximum queue depth, and again to zero. This may negatively affect performance. There is thus a need for addressing these and/or other issues associated with the prior art.

SUMMARY

A system, method, and computer program product are provided for inserting a gap in information sent from a drive to a host device. In operation, one or more commands are received at a drive from a host device. Additionally, information is queued to send to the host device. Furthermore, a gap is inserted in the information to send to the host device such that the host device is capable of sending additional commands to the drive.

DETAILED DESCRIPTION

Figure 1:
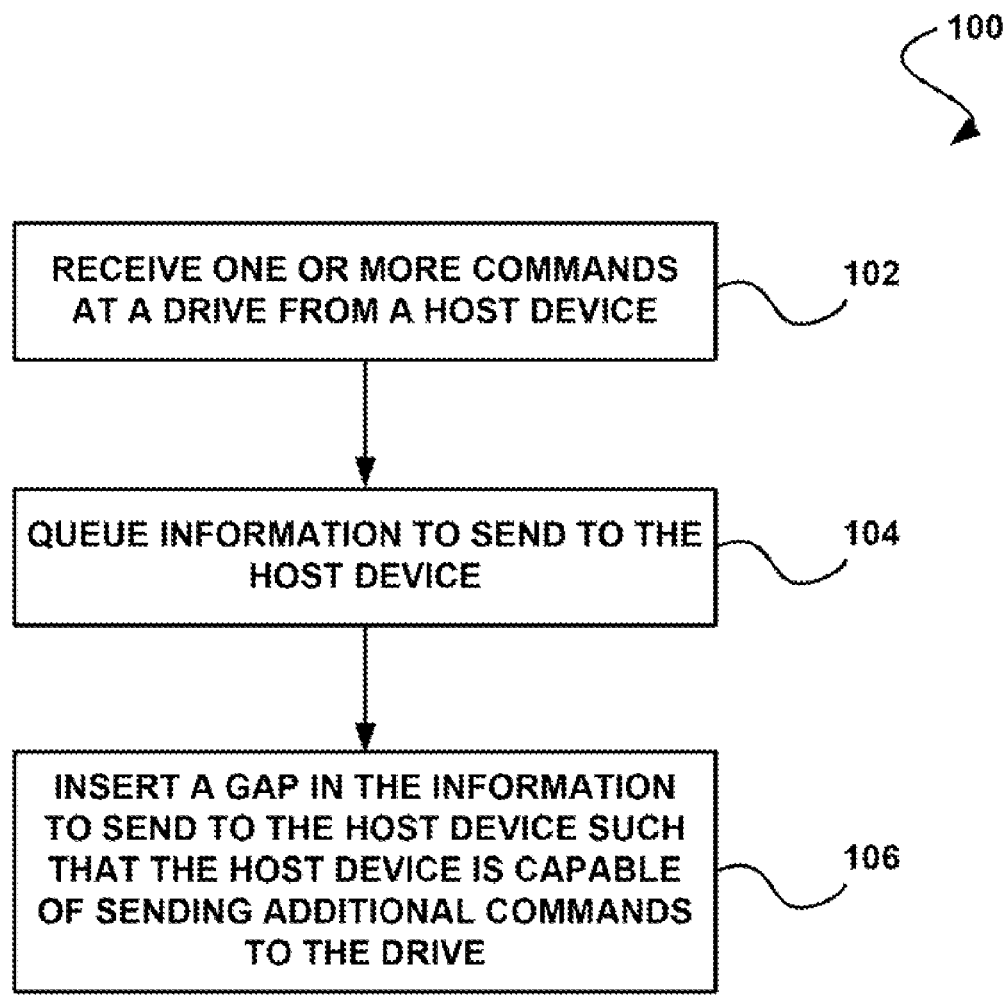
FIG. 1 shows a method for inserting a gap in information sent from a drive to a host device, in accordance with one embodiment.

FIG. 1 shows a method 100 for inserting a gap in information sent from a drive to a host device, in accordance with one embodiment. As shown, one or more commands are received at a drive from a host device. See operation 102.

The commands may include any command or instruction capable of being sent from the host device to the drive. For example, in one embodiment, the command may include a command to transfer data (e.g. a transfer request, etc.). In another embodiment, the command may include a command to access a portion of memory associated with the drive.

The drive may include any drive capable of storing data. For example, in one embodiment, the drive may include a Serial ATA (SATA) drive. In various other embodiments, the drive may include, but is not limited to, a Serial Attached SCSI (SAS) drive, a Fibre Channel (FC) drive, or a Universal Serial Bus (USB) drive, and/or any other storage device or drive.

Further, the host device may include any device capable of sending commands to the drive. For example, in various embodiments, the host device may include a desktop computer, a lap-top computer, and/or any other type of logic. Still yet, the host device may take the form of various other devices including, but not limited to, a personal digital assistant (PDA) device, a mobile phone device, etc.

As shown further in FIG. 1, information is queued to send to the host device. See operation 104. In one embodiment, the information may be queued in a buffer or a device capable of queuing data.

The information may include any data or information associated with the data (e.g. data type information, data structure information, etc.). In one embodiment, the information may include setup information and data associated with at least one of the commands. For example, the commands received at the drive from the host device may include a command to retrieve data.

The drive may then queue the data and setup information. In one embodiment, the setup information may include a direct memory access (DMA) frame information structure (FIS). In another embodiment, the setup information may include a set device bit FIS. It should be noted that, in various embodiments, the gap may be time based or command threshold based or a combination of both these things. The threshold may also be based on the number of commands and the queue depth or other parameters.

Furthermore, a gap is inserted in the information to send to the host device such that the host device is capable of sending additional commands to the drive. See operation 106. In the context of the present description, a gap refers to break, interruption, or delay where the host device is capable of sending commands to the drive.

In various embodiments, the gap may include a time delay, or additional information, etc. For example, in one embodiment, inserting the gap may include inserting a time delay. In another embodiment, inserting the gap may include inserting additional information.

The additional information may include any type of information. For example, in one embodiment, the additional information may include information indicating a length of the gap. In another embodiment, the additional information may include vender specific information. In yet another embodiment, the additional information may include information associated with the gap.

In still another embodiment, the information may include setup information including information indicating the time delay is following the setup information. In this case, the information may include status information and the time delay may be inserted before sending the status information or after the status information.

It should be noted that the gap may be inserted at any point when sending the information. For example, in the case that the gap includes a time delay, the time delay may be inserted before sending the setup information. In another embodiment, the time delay may be inserted after sending the setup information.

In either case, the additional commands may be received at the drive from the host device during a period of the time delay. In one embodiment, inserting the gap may include inserting the gap during a period when the information is being sent to the host device.

It should be noted that a point when the gap is inserted may be based on a variety of parameters. For example, in one embodiment, the gap may be inserted based on a current queue depth of the drive. In another embodiment, the gap may be inserted based on an amount of time since a previous command was received.

Furthermore, the length or size of gap may be based on a variety of parameters. For example, in one embodiment, a length of time of the time delay may be based on a current queue depth of the drive. In another embodiment, a length of time of the time delay may be based on an amount of time since a previous command was received.

In either case, as an option, at least one of a length of time of the time delay or a point when the time delay is inserted may be determined in real time. As another option, at least one of a length of time of the time delay or a point when the time delay is inserted may be a predetermined value. In this case, the predetermined value may be a value set in the hardware or the software.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
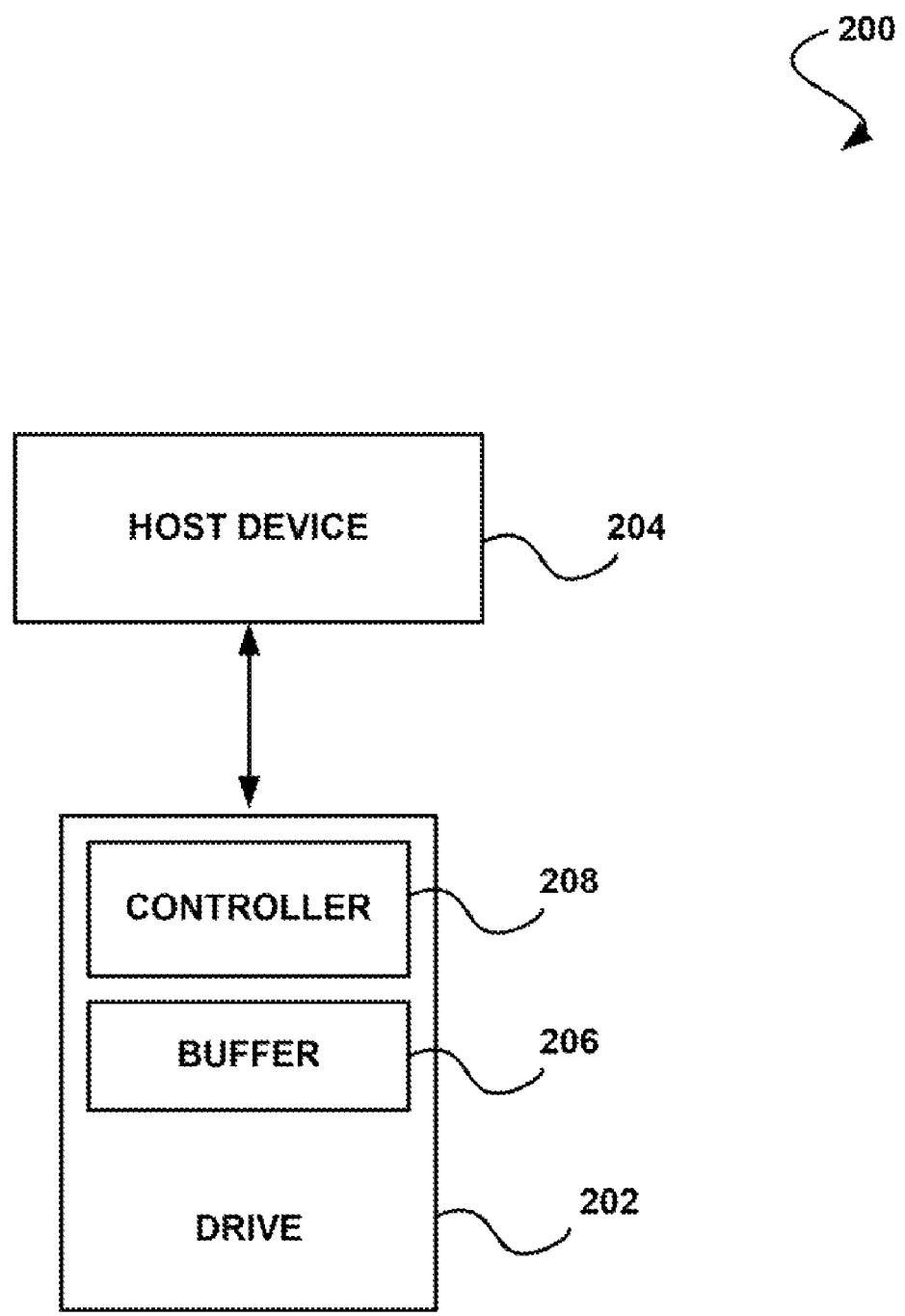
FIG. 2 shows a system for inserting a gap in information sent from a drive to a host device, in accordance with one embodiment.

FIG. 2 shows a system 200 for inserting a gap in information sent from a drive to a host device, in accordance with one embodiment. As an option, the present system 200 may be implemented to carry out the method 100 of FIG. 1. Of course, however, the system 200 may be implemented in any desired environment, it should also be noted that the aforementioned definitions may apply during the present description.

As shown, the system 200 includes a drive 202 for receiving one or more commands from a host device 204. Furthermore, the system 200 includes a buffer 206 for queuing information to send to the host device 204. Still yet, the system 200 includes a controller 208 for inserting a gap in the information to send to the host device 204 such that the host device 204 is capable of sending additional, commands to the drive 202 after the drive 202 has initiated sending the information to the host device 204.

It should be noted that the drive 202 may include various types of drives such as a SATA drive, an SAS drive, an FC drive and/or any other storage device or drive. By inserting gaps in the information, drives that fetch data very quickly may be configured such that they do not oscillate from a maximum queue depth to zero when the drives have started sending data.

For examples, in SATA, the target generally has priority when transmitting frames over the host when there is a collision. Additionally, typically in SATA, when queuing commands (e.g. using First Party Direct Memory Access, etc.), once the target has sent a DMA setup FIS to enter the data phase, the host can not send any commands to the target.

If the drive can fetch data really quickly then a host could send a number of commands equal to a maximum queue depth (e.g. 32, etc.) to the drive. Typically, the drive may then return a DMA setup, data, a DMA setup, data, etc. with no gaps between, the frames. This does not allow the host to send any more commands.

The queue depth of the drive will oscillate from the maximum queue depth (e.g. 32, etc.) to 0 and back to the maximum queue depth (e.g. 32, etc) to 0. This may negatively affect performance. In some cases, hard disk drives (HDDs) are so slow that there are gaps in the data so this oscillation does not occur. However, with faster drives the oscillation may occur.

Thus, in one embodiment, one or more gaps may be inserted before sending a DMA setup out the host device 204 to allow the host device 204 to send more commands to the drive 202. The point when the gap is inserted may be based on a variety of parameters including a current queue depth of the drive 202 or the amount of time since the last command. In one embodiment, the point when the gap is inserted may be based on the current queue depth of the drive 202, the amount of time since the last command, or a combination of these or some other parameter.

Further, a length of the gap to allow commands to be sent from the host device 204 may also be based on a variety of parameters. For example, the length of the gap may be based on the queue depth, time, or some other parameter. In various embodiments, these parameters may be tuned in real time by either the host device 204 or the drive 202. As an option, the parameters may also be set to fixed values.

In one embodiment, the drive 202 may signal the host device 204 by adding information to the DMA setup to indicate there will be a gap after this DMA setup. As an option, the host device 204 may signal the end of sending commands by adding information into the command, it should also be noted that, in one embodiment, the gaps may also be inserted before sending status. This may be performed instead of inserting the gaps before the DMA setup FIS, or in addition to inserting the gaps before the DMA setup FIS.

Figure 3:
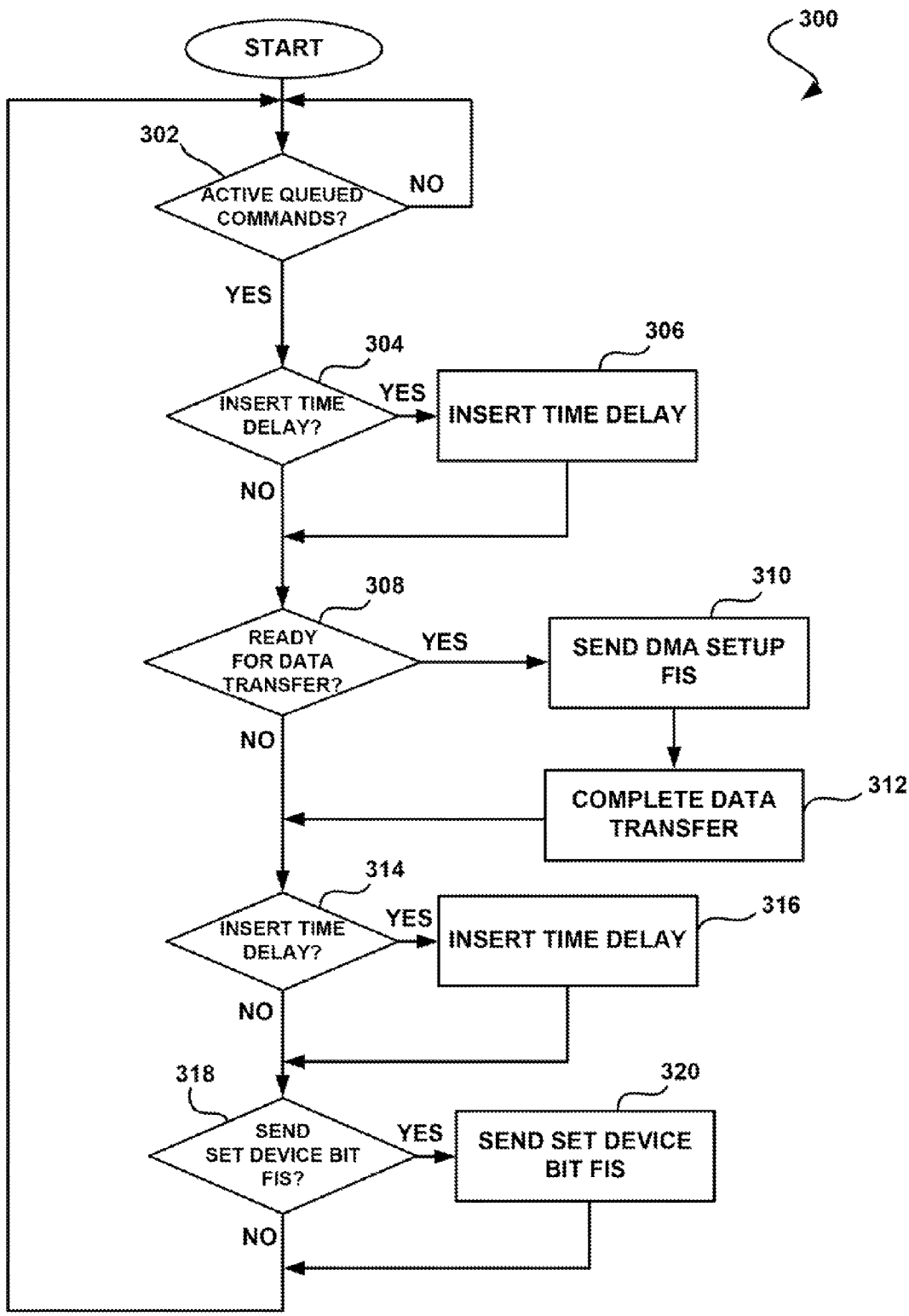
FIG. 3 shows a method for inserting a gap in information sent from a drive to a host device, in accordance with another embodiment.

FIG. 3 shows a method 300 for inserting a gap in information sent from a drive to a host device, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, it is determined whether active queued commands are present. See operation 302. In this case, the active queued commands may be active queued commands in a buffer associated with a drive.

If active queued commands are present, it is determined whether to insert, a time delay. See operation 304. In one embodiment, a timer may be used to insert the time delay.

If it is determined to insert the time delay, the time delay is inserted. See operation 306. It is then determined whether the system is ready for data transfer. See operation 308.

If the system is ready for data transfer, a DMA setup FIS is sent. See operation 310. Once the DMA setup FIS is sent, the data transfer is completed. See operation 312. It should be noted that the DMA setup may be for only a piece of data associated with a command. Once this piece of data has completed transferring, then a gap may be inserted.

Thus, it is then again determined whether to insert a time delay. See operation 314. If it is determined to insert the time delay, the time delay is inserted. See operation 316.

As shown further, it is determined whether to send a set device bit FIS. See operation 318. If it is determined to send the set device bit FIS, the set device bit FIS is sent. See operation 320.

In this way, the host device is capable of sending commands to the drive, even when the drive has started sending data. It should be noted that, although not illustrated in FIG. 3, information may be sent to the host device during the period of the time delay. For example, information regarding the duration of the time delay or vender specific information may be inserted.

Figure 4:
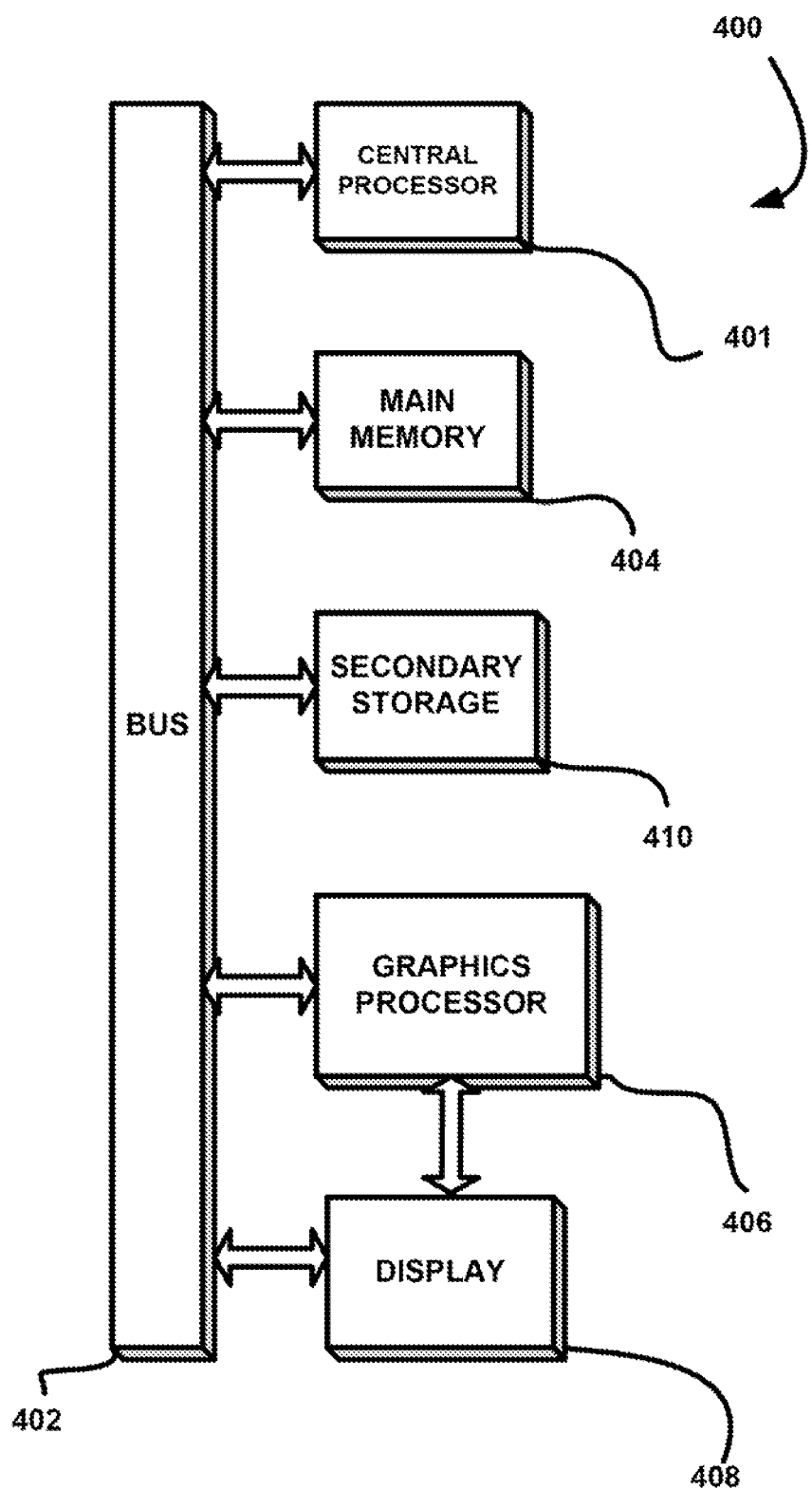
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving one or more commands at a drive from a host device, the host device and the drive communicating via a storage protocol comprising DMA data phases wherein the drive is enabled to prevent the host device from sending additional commands to the drive;
    queuing information to send to the host device;
    determining, as a function of drive state and independent of current host signaling, whether to insert a gap in the information to send to the host device, such that the gap is between respective data of a consecutive two of the DMA data phases and that the host device is enabled to send the additional commands to the drive;
    conditionally inserting the gap based on the determining and otherwise not inserting the gap; and
    wherein the function of drive state comprises a function of a current queue depth of the drive.

2. The method of claim 1, wherein the information to send to the host includes setup information and data associated with at least one of the one or more commands.

3. The method of claim 2, wherein the setup information includes a direct memory access (DMA) frame information structure (FIS).

4. The method of claim 2, wherein the setup information includes a set device bit FIS.

5. The method of claim 2, wherein a time delay is inserted before sending the setup information.

6. The method of claim 2, wherein a time delay is inserted after sending the setup information.

7. The method of claim 1, further comprising receiving the additional commands at the drive from the host device during a time delay.

8. The method of claim 1, wherein inserting the gap includes inserting a time delay during a period when the information is being sent to the host device.

9. The method of claim 1, wherein the gap is not inserted in response to the current queue depth equaling zero.

10. The method of claim 1, wherein the function of drive state comprises a function of an amount of time since a previous command was received.

11. The method of claim 8, wherein a length of time of the time delay is based on the current queue depth of the drive.

12. The method of claim 8, wherein a length of time of the time delay is based on an amount of time since a previous command was received by the drive.

13. The method of claim 1, wherein at least one of a length of time of a time delay or a point when the time delay is inserted is determined in real time.

14. The method of claim 1, wherein at least one of a length of time of a time delay or a point when the time delay is inserted is a predetermined value.

15. The method of claim 1, wherein the information to send to the host includes setup information including additional information indicating a time delay is following the setup information.

16. The method of claim 1, wherein the information to send to the host includes status information and a time delay is inserted before sending the status information.

17. The method of claim 1, wherein inserting the gap includes inserting additional information.

18. The method of claim 1, wherein the host device is informed about the gap in advance of the gap.

19. The method of claim 1, wherein the drive includes a Serial ATA (SATA) drive.

20. A computer program product embodied on a computer readable medium, comprising:
- computer code for receiving one or more commands at a drive from a host device, the host device and the drive communicating via a storage protocol comprising DMA data phases wherein the drive is enabled to prevent the host device from sending additional commands to the drive;
- computer code for queuing information to send to the host device;
- computer code for determining, as a function of a current queue depth of the drive and independent of current host signaling, whether to insert a gap in the information to send to the host device such that the gap is between respective data of a consecutive two of the DMA data phases and that the host device is enabled to send the additional commands to the drive; and
- computer code for conditionally inserting the gap based on the determining and otherwise not inserting the gap.

21. An apparatus, comprising:
- a drive enabled to receive one or more commands from a host device, the host device and the drive enabled to communicate via a storage protocol comprising DMA data phases wherein the drive is enabled to prevent the host device from sending additional commands to the drive;
- a buffer enabled to queue information to send to the host device; and
- a controller enabled to make a determination, as a function of a current queue depth of the buffer and independent of current host signaling, whether to insert a gap in the information to send to the host device, such that the gap is between respective data of a consecutive two of the DMA data phases and that the host device is enabled to send the additional commands to the drive, the controller being further enabled to conditionally insert the gap based on the determination and to otherwise not insert the gap.

* * * * *